United States Patent [19]

Kanno et al.

[11] Patent Number: 4,538,183
[45] Date of Patent: Aug. 27, 1985

[54] IMAGE EDITING APPARATUS

[75] Inventors: Masayuki Kanno, Fujisawa; Hisao Tezuka; Kouji Izawa, both of Yokohama; Tadanobu Kamiyama, Yokosuka, all of Japan

[73] Assignee: Tokyo Shibaura Denki Kabushiki Kaisha, Kawasaki, Japan

[21] Appl. No.: 454,110

[22] Filed: Dec. 28, 1982

[30] Foreign Application Priority Data

Jan. 8, 1982 [JP] Japan .................................. 57-887

[51] Int. Cl.³ .............................................. H04N 1/40
[52] U.S. Cl. .................................... 358/280; 358/287; 364/523
[58] Field of Search .................. 358/280, 256, 287; 364/523

[56] References Cited

U.S. PATENT DOCUMENTS

| 4,034,400 | 7/1977  | Owen       | 358/256 |
| 4,196,450 | 4/1980  | Miller     | 358/280 |
| 4,231,069 | 10/1980 | Wellendorf | 358/256 |
| 4,240,119 | 12/1980 | Norton     | 358/280 |
| 4,303,948 | 12/1981 | Arai       | 358/287 |
| 4,327,380 | 4/1982  | Yamada     | 358/287 |
| 4,435,723 | 3/1984  | Seimiya    | 358/300 |

FOREIGN PATENT DOCUMENTS 2513571  4/1983  France .

OTHER PUBLICATIONS

Japanese Patent Disclosure (Kokai) No. 55-28121; N. Kasahara et al.; Feb. 28, 1980.
Japanese Patent Disclosure (Kokai) No. 56-67446; K. Iida; Jun. 6, 1981.
IEEE Computer Society Workshop on Computer Architecture for Pattern Analysis and Image Database Management, Hot Spring, Va., U.S., Nov. 11-13, 1981, pp. 301-308.
IEEE Transactions on Communications, vol. COM-29, No. 12, Dec. 1981, pp. 1891-1897, New York.

Primary Examiner—Howard W. Britton
Attorney, Agent, or Firm—Oblon, Fisher, Spivak, McClelland & Maier

[57] ABSTRACT

In an image editing apparatus adapted to cut a plurality of regions of any size from a plurality of documents and prepare a new document by sticking the cut regions on a sheet. The cut regions are designated by a light pen of an instruction input section for each document displayed on a CRT display. The coordinate information of the cut regions is stored in a RAM in a sticking region computer and the image information is stored in a first buffer (RAM). A ROM in the sticking region computer stores information relating to a plurality of basic patterns representing the manner of sticking a plurality of cut regions. The coordinates of a plurality of sticking regions are calculated for each basic pattern on the basis of the coordinate data of the cut regions. An image processor causes the image data of the cut regions which are stored in the first buffer to be transferred to memory area of a second buffer (RAM) which is designated by the coordinates of the corresponding sticking regions. The editing of images is carried out for each basic pattern. The "edited" image data stored in the second buffer is displayed on a second CRT display.

13 Claims, 21 Drawing Figures

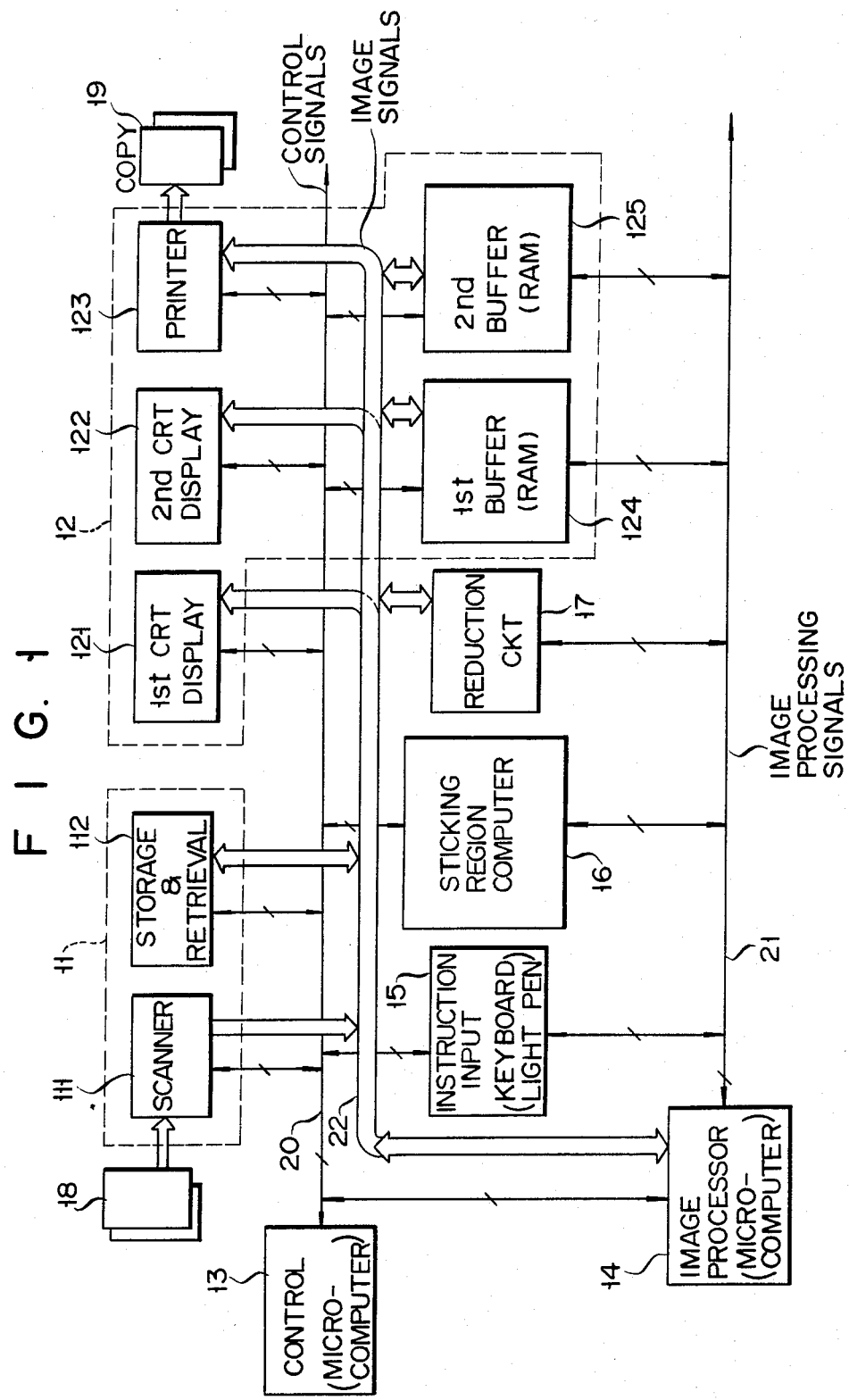

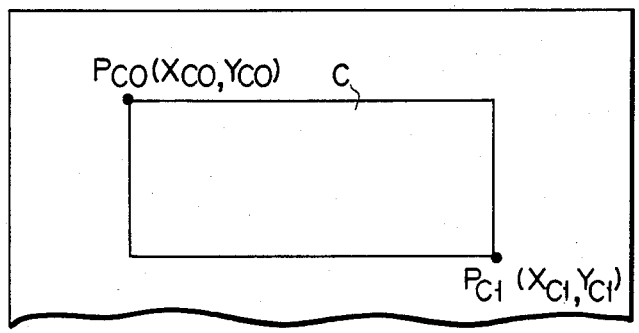
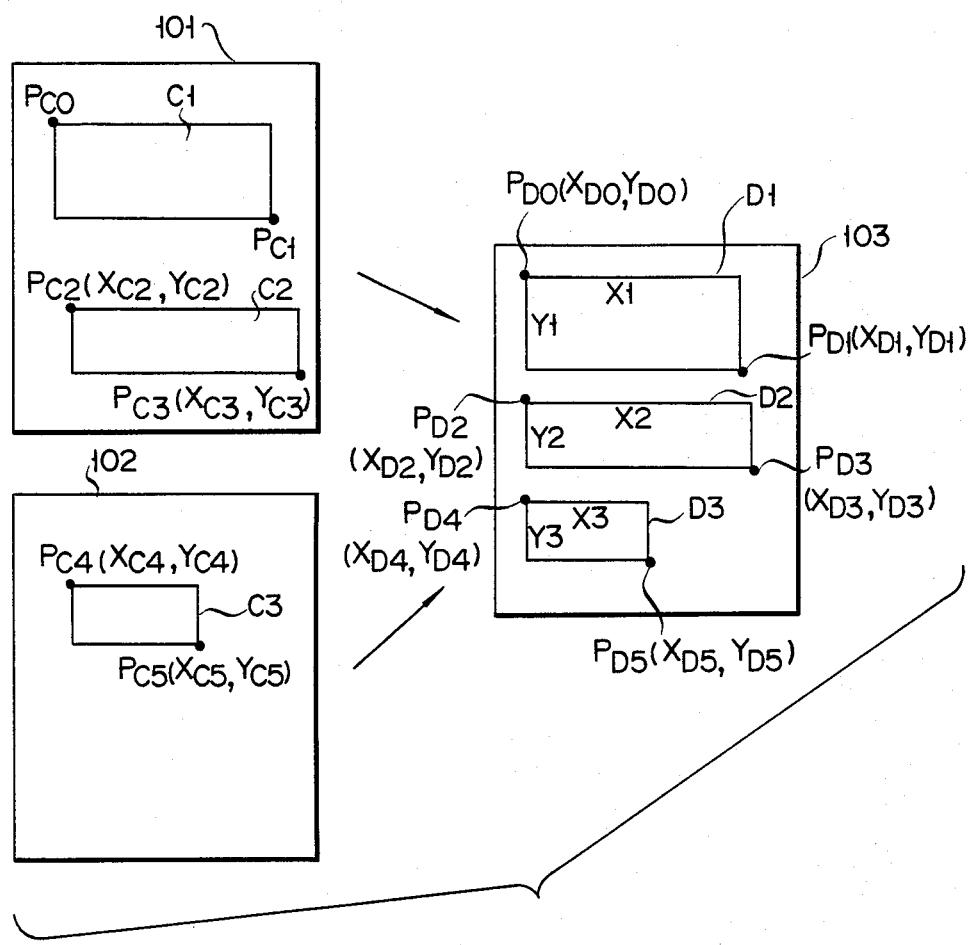

F I G. 4
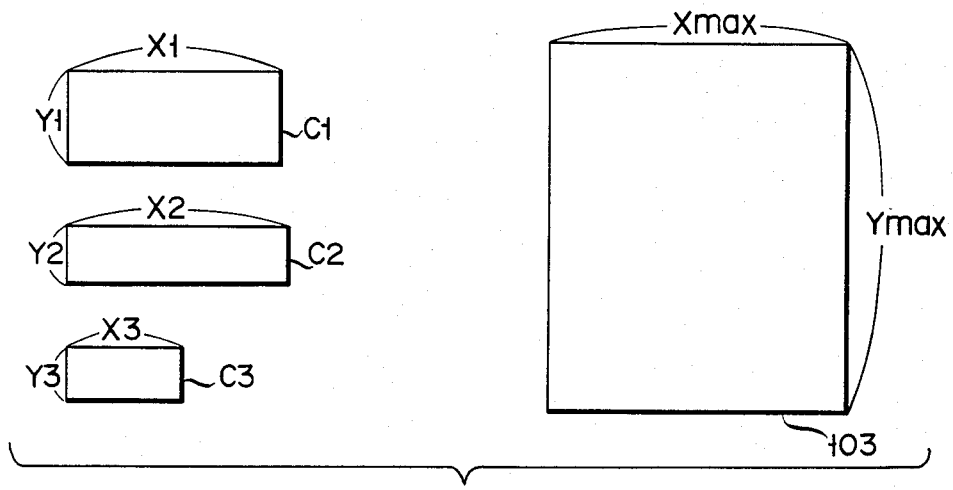
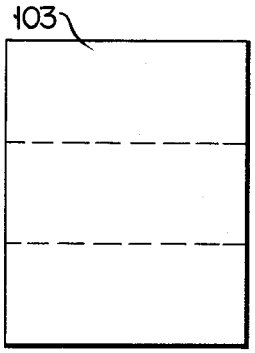
F I G. 5A
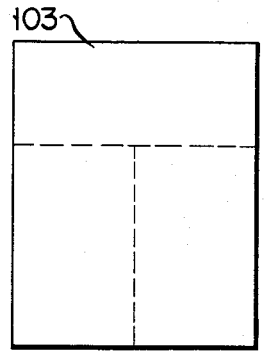
F I G. 5B
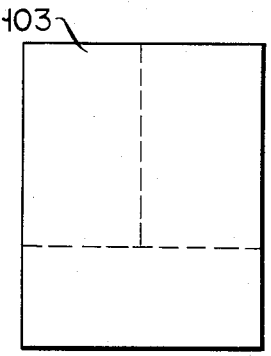
F I G. 5C
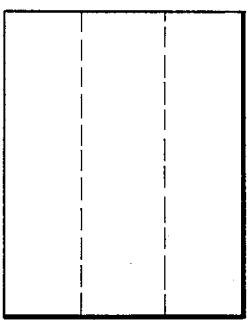
F I G. 5D
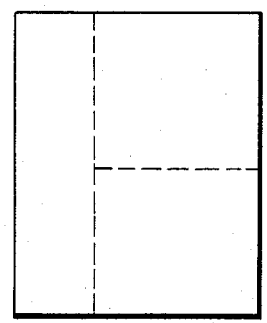
F I G. 5E
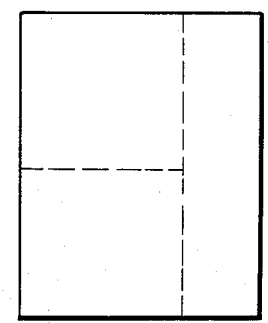
F I G. 5F

IMAGE EDITING APPARATUS

BACKGROUND OF THE INVENTION

This invention relates to a document editing apparatus for editing documents or manuscripts containing characters and images without any hand work.

The rationalization of the office works is now under way under the name of the office automation. For the office works a most important consideration is paid to the proper management and utilization of documents. In order to utilize, for example, the documents without being hoarded, it is desirable to edit them in more utilizable form.

A simplest editing method is to manually stick cut regions of documents on a sheet. This method is very uneconomical from the standpoint of the preservation of the documents as well as the effective utilization of labor. As a solution to this problem, the following methods may be considered.

A first method is to enter specific marks and symbols designating an editing operation on a specific sheet and read out them by a facsimile unit so that the editing operation is carried out. In this method, it is necessary for an editor to designate cut regions of documents and corresponding sticking regions of the sheet. With the editing designation marks entered on the document, the document is soiled, presenting a document management problem. The use of the specific sheet prevents the wide acceptance of the image editing apparatus.

A second method is to perform an editing operation utilizing a computer. In this method, an editing mode and editing regions are designated through a keyboard, while displaying the document on a display unit. This method is desirable from the standpoint of the management of documents, because the documents can be stored as image data. It is necessary, however, for the editor to designate the cut regions of the documents and corresponding sticking regions of the sheet to the apparatus through the keyboard. It is difficult and time-consuming to prepare a new document by, for example, cutting desired regions from a plurality of documents and sticking them on a sheet of paper. For this reason, the editing operation depends much on the skill of the editor.

SUMMARY OF THE INVENTION

An object of this invention is to provide an image editing apparatus which can prepare a new document by extracting out of existing documents the image data of any proper regions and synthesizing them, whereby a ready editing operation is performed.

According to this invention a plurality of basic sticking patterns are initially prepared, according to which a plurality of cut regions from a plutality of documents are stuck on a sheet. A sticking region computer calculates the coordinates of those sticking regions corresponding to the cut regions in connection with the respective sticking patterns. An image processor causes image information of the respective cut regions which are stored in a first RAM to be transferred to the memory location of a second RAM which is designated by the calculated coordinate data of the sticking regions. An image editing process is performed with respect to the respective basic sticking patterns and displayed on a CRT display.

According to this invention no complicated operation is required, because a plurality of cut regions are automatically stuck on a sheet according to the sticking patterns which are initially prepared in the image editing apparatus. During the editing operation, the sticking of the cut regions are performed in substantially fixed manner. If three patterns of high frequency are initially prepared, they are applicable to almost any case. It is possible for the editor to select a desired one out of the documents which are edited according to a plurality of patterns.

BRIEF DESCRIPTION OF THE DRAWINGS

FIG. 1 is a block diagram of an image editing apparatus of this invention;

FIG. 2 is a view showing a method for designating the cut regions of a document to be edited;

FIG. 3 is a view for explaining an editing method using an image editing apparatus of this invention;

FIG. 4 shows a dimensional relation of a plurality of cut regions to a sheet on which they are stuck;

FIGS. 5A to 5F shows six basic sticking patterns according to which three cut regions are stuck on a sheet;

DETAILED DESCRIPTION OF THE PREFERRED EMBODIMENTS

Figure 6:
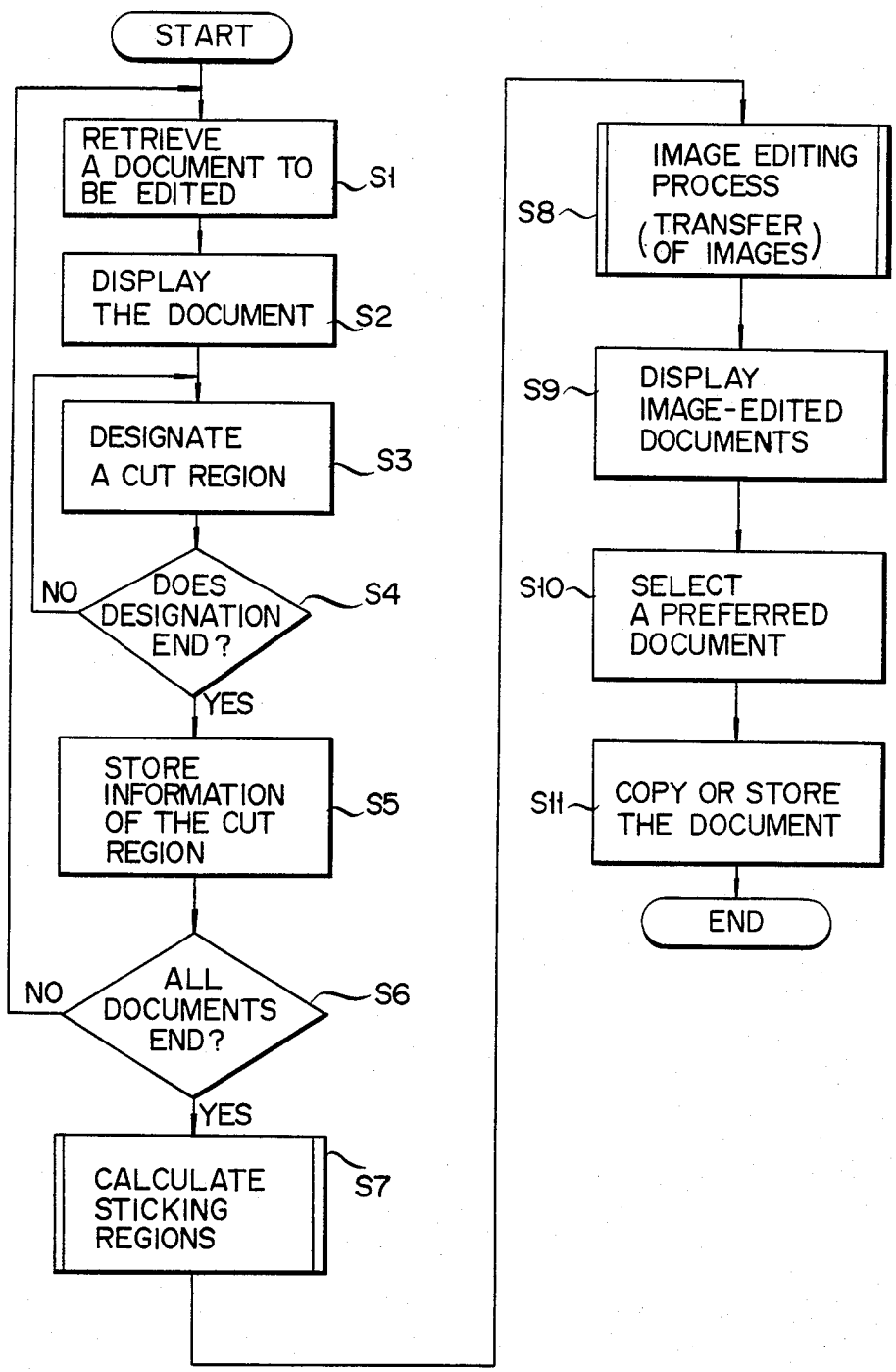
FIG. 6 shows a flow chart for explaining the operation of the image editing apparatus of this invention.

An editing apparatus of FIG. 1 comprises an input section 11, output section 12, control section 13, image processor 14, instruction input section 15, sticking region computer 16 and reduction circuit 17. An editing operation is automatically performed by control section 13 and image processor 14 which are comprised of a microcomputer such as Intel 8085. Control section 13 controls the whole operation of the apparatus, and image processor 14 effects the editing control such as the calculation of sticking regions on a sheet and transfer of the image information. Reference numeral 20 designates a control signal bus connecting control section 13 to the associated parts and reference numeral 21 designates a bus for image processing signals which connects image processor 14 to the parts associated with the editing operation. Reference numeral 22 denotes an image signal bus for connecting image processor 14 to those parts which handle the image information.

The editing properly performed by the image editing apparatus of this invention is to stick, for example, cut regions $C_1$ and $C_2$ of a first document 101 and cut region $C_3$ of a second document 102 on one sheet 103 as shown in FIG. 3. According to this invention a plurality of basic sticking patterns are prepared to permit a plurality of cut regions to be stuck on one sheet. Where a plurality of basic patterns are found which permits the sticking of a plurality of cut regions, it is possible to select one of them. For convenience of explanation it is assumed that documents 101, 102 to be cut are of the same size (for example, an A4 size) as that of sheet 103 on which the cut regions are stuck.

Input section 11 includes a scanner 111 and a document file 112 using an optical disc or a magnetic disc. A document to be edited is an input document 18 to be read out by scanner 111 or a document stored in file 112 which is retrieved by instruction input section 15. Such document is displayed on a first CRT (cathode ray tube) display 121 of output section 12. While observing the document on display 121, two points $P_{C0}$ and $P_{C1}$ on a diagonal line of a rectangular region to be cut which is shown in FIG. 2 are designated by a light pen of instruction input section 15. As a result, the coordinate ($X_{C0}$, $Y_{C0}$) and ($X_{C1}$, $Y_{C1}$) on the two points are detected in instruction input section 15 and these coordinate data are stored in a RAM (random access memory) in sticking region computer 16. The other regions to be cut of the same document and/or the regions to be cut of another document are designated in a similar manner. When the regions to be cut are so designated, image processor 14 extracts the image information of the cut regions on the basis of the coordinate data of the cut regions to permit them to be stored in first buffer 124 (512 K byte RAM). When the designation of all the cut regions is completed, the coordinate data ($X_{D0}$, $Y_{D0}$ through $X_{D5}$, $Y_{D5}$) of the sticking regions as indicated by $D_1$, $D_2$, $D_3$ on a sheet 103 of FIG. 3 are calculated on the basis of the coordinate data of the cut regions which are stored in sticking region computer 16.

Stated in more detail, sticking region computer 16 comprises a RAM for storing the coordinate data of the cut regions and ROM (read only memory) for storing the process steps. ROM further stores information on six basic sticking pattern as shown in FIGS. 5A to 5F, as to how cut regions $C_1$, $C_2$, $C_3$ are stuck on sheet 103 and data ($X_{max}$, $Y_{max}$ of sheet 103 as shown in FIG. 4) as to the size of sheet 103. Image processor 14 judges whether or not all the cut regions $C_1$, $C_2$, $C_3$ can be stuck on sheet 103 in connection with all the basic sticking patterns on the basis of the coordinate data of the cut regions which are stored in sticking region computer 16, judges whether or not the reduction of the cut regions is necessary for sticking, and finds the coordinates $X_{D0}$, $Y_{D0}$ through $X_{D5}$, $Y_{D5}$ of regions $D_1$, $D_2$, $D_3$ which can be stuck on sheet 103 as shown in FIG. 3. The coordinate data of sticking regions $D_1$, $D_2$, $D_3$ are computed with respect to those basic patterns which are judged as fit patterns. These coordinate data, together with the coordinate data of the cut regions, are stored in RAM. In an example of FIG. 3, cut regions $C_1$, $C_2$, $C_3$ are stuck on sheet 103 according to the basic pattern as shown in FIG. 5A.

When the sticking regions are computed, the image editing process is performed. In the image editing process, the transfer of image information is carried out. That is, image processor 14 designates the addresses of sticking regions D1, D2, D3 of a second buffer (512 K byte RAM) 125 on the basis of the computed coordinate data and transfer the image information of the cut regions stored in first buffer 124 to the memory locations of second buffer 125 which are designated by these addresses.

The image information of sticking regions $D_1$, $D_2$, $D_3$ are stored in the A4 size memory locations of second buffer 125 in such a relation as indicated on the right side of FIG. 3 which shows an edited document. The "edited" information are stored in second buffer 125 for each basic pattern which permits the sticking of cut regions $C_1$, $C_2$, $C_3$. The "edited" image information associated with A4 size which are stored in second buffer 125 are displayed on second CRT display 122 for each fit basic pattern. The editor can select a desirable pattern. The image information edited according to the selected pattern may be stored in image file 112 and/or may be printed out by a printer 123 as a hard copy 19. The operation of the editing apparatus of FIG. 1 will be described below in more detail by referring to a flow chart.

FIG. 6 shows a whole flow chart associated with the operation of the image editing apparatus.

At the start of an editing operation, the editor retrieves a to-be-edited document stored in image file 112 through a keyboard of instruction input section 15 at step $S_1$. The document to be edited may optically be read out by scanner 111. At step $S_2$, the retrieved document is displayed on first CRT display 121. The editer goes ahead with the editing operation, while watching first CRT display 121.

When the document is displayed on CRT display, the editor designates a cut region C, as shown in FIG. 2, by pointing at two points $P_{C0}$, $P_{C1}$ on the cut region C with the light pen of instruction input section 15. When the designation of one cut region is completed, the editor indicates the completion of the designation, through the keyboard. At step $S_4$, judgement is made as to whether or not the designation of the cut region is completed. If the designation of cut region is completed, then the process goes to step $S_5$.

At step $S_5$, image processor 14 stores the coordinate data ($X_{C0}$, $Y_{C0}$, $X_{C1}$, $Y_{C1}$) on the two points $P_{C0}$, $P_{C1}$ of the cut region C which are detected at instruction input section 15 in the RAM of sticking region computer 16 and the image information of the cut region of document in first buffer 124 on the basis of the detected coordinate data. When the retrieval of the documents to be edited and the designation of the regions are completed, the process goes to the next step.

In designating the coordinates of the cut region at step $S_3$, the editor may input, through the keyboard, information as to the attributes of the cut region, such as the priority, inhibition of the reduction and the order of cutting. The information as to the attributes, together with the coordinate data, are stored in RAM of sticking region computer 16.

The steps heretofore mentioned involve the intervention of the editor.

When, as shown in FIG. 3 for example, the cut regions $C_1$, $C_2$ of first document 101 and cut region $C_3$ of second document 102 are designated, the coordinate data ($X_{C0}$, $Y_{C0}$) through ($X_{C5}$, $Y_{C5}$) on points $P_{C0}$ through $P_{C5}$ of the cut regions are stored in RAM and the image information of the cut regions are stored in first buffer 124 according to the order of the designation.

At step $S_7$, the sticking regions corresponding to cut regions $C_1$, $C_2$, $C_3$ are calculated.

As will be set out below, at this step, examination is made as to whether or not the cut regions $C_1$, $C_2$, $C_3$ can be stuck on the sheet according to the basic sticking patterns as shown in FIGS. 5A through 5F. The coordinates of the sticking regions are computed for each fit basic pattern. These coordinate data, together with the coordinate data of the cut regions, are stored in the RAM of sticking region computer 16. If size reduction is necessary for sticking, the coordinates of the reduced sticking regions are calculated. When the coordinates of the sticking regions are calculated, the image editing (the transfer of the image information) is carried out at step $S_8$. Namely, at this step, image processor 14 transfers the image information from first buffer 124 to second buffer 125 on the basis of the coordinate data of the sticking regions. The image editing is carried out for each fit basic pattern.

At step $S_9$, the image processor 14 reads the "edited" image information out of second buffer 125 for each fit basic pattern according to an instruction of the editor and displays them on CRT display 122.

At step $S_{10}$, the editor can select a desired edited document through the keyboard, while viewing the screen of second CRT display 122. A step $S_{11}$, the selected document is printed out by printer 123 or stored in image file 112.

Figure 7:
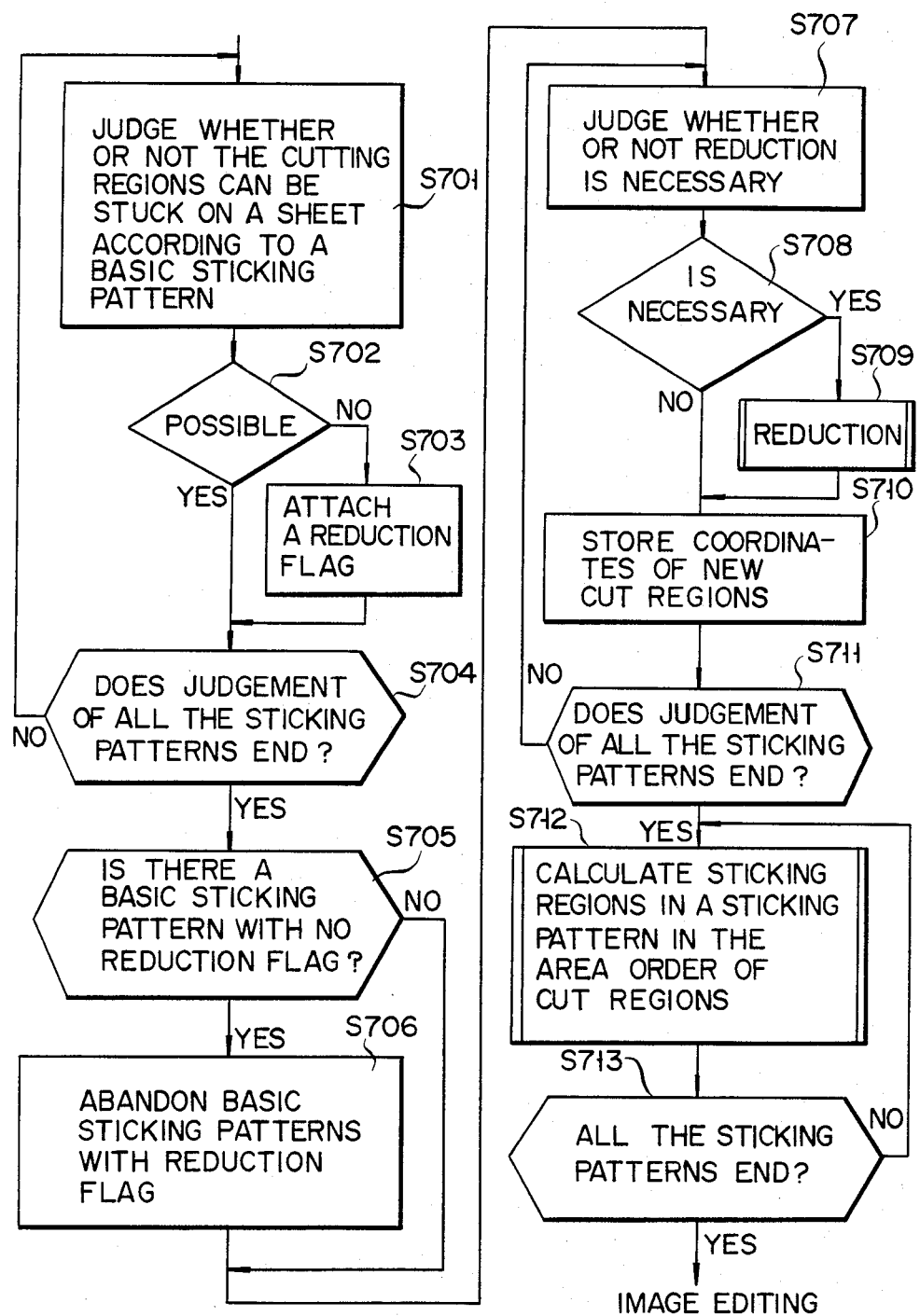
FIG. 7 shows a flow chart for showing a sticking region calculating process.

The sticking region computing process will be explained below by referring to a detailed flow chart of FIG. 7 which is related to the sticking region computing step of FIG. 6.

At step $S_{701}$, judgement is made as to whether or not the cut regions can be stuck on the sheet, according to the basic patterns as shown in FIG. 5A to 5F, on the basis of the coordinate data of cut regions $C_1$, $C_2$, $C_3$ which are stored in the RAM in sticking region computer 16.

When the coordinates of two points on the diagonal line of cut regions $C_1$, $C_2$, $C_3$ are determined as shown in FIG. 4, the lateral length (the width) X and longitudinal length (the height) Y of the cut regions can readily been obtained and examination is made as to whether or not the cut regions can be stuck on the sheet 103 of a dimension $X_{max} \times Y_{max}$ according to the basic patterns.

FIG. 5A shows a basic pattern for sticking three cut regions in the vertical direction and FIG. 5B shows a basic pattern for sticking three cut regions such that one cut region is arranged at the upper section of the pattern with the remaining two cut regions located side by side in the horizontal direction. FIG. 5C shows a basic pattern for sticking three cut regions such that two cut regions are arranged side by side at the upper section of the pattern with the remaining one region located at the lower section thereof. FIG. 5D shows a basic pattern for sticking three cut regions side by side in the horizontal direction. FIG. 5E shows a basic pattern for sticking three cut regions such that one cut region is arranged on the left side with the remaining two cut regions located one above the other on the right side of the pattern. FIG. 5F shows a basic pattern for sticking three cut regions such that two cut regions are arranged one above the other at the left side of the pattern with the remaining one cut region located at the right side thereof. In this embodiment, as stated above, it is assumed that the document to be edited is of the same size as that of the document on which the cut regions are stuck. Therefore, the width ($X_1$, $X_2$, $X_3$) of the cut region is below $X_{max}$ and the hight ($Y_1$, $Y_2$, $Y_3$) thereof is below $Y_{max}$.

At step $S_{701}$, image processor 14 finds a sum ($Y_1 + Y_2 + Y_3$) of heights of cutting regions $C_1$, $C_2$, $C_3$. If $Y_1 + Y_2 + Y_3 \leq Ymax$, the cut regions $C_1$, $C_2$, $C_3$ are judged as being capable of being stuck on the sheet according to the sticking pattern of FIG. 5A. If $X_1 + X_2 + X_3 \leq Xmax$, the cut regions $C_1$, $C_2$, $C_3$ are judged as being capable of being stuck on the sheet according to the sticking pattern of FIG. 5D.

For sticking the cut regions on the sheet according to the pattern of FIG. 5B, there are three sticking ways depending on which one of the cut regions $C_1$, $C_2$, $C_3$ is located at the upper section of the pattern. When $X_2 + X_3 \leq X_{max}$, $Y_1 + Y_3 \leq Y_{max}$, it is judged that the three cut regions $C_1$, $C_2$, $C_3$ can be stuck on the sheet according to the pattern of FIG. 5B with the cut region $C_1$ located at the upper section of the pattern. When $X_1 + X_3 \leq X_{max}$, $Y_1 + Y_2 \leq Y_{max}$ and $Y_2 + Y_3 \leq Y_{max}$, the three cut regions can be stuck on the sheet according to the pattern of FIG. 5B with the cut region $C_2$ located at the upper section of the pattern. When $X_1 + X_2 \leq X_{max}$, $Y_1 + Y_3 \leq Y_{max}$ and $Y_2 + Y_3 \leq Y_{max}$, the three cut regions $C_1$, $C_2$, $C_3$ are stuck on the sheet according to the pattern of FIG. 5B with the cut region $C_3$ located on the upper section of the pattern. In this way, the judgement is continued until one of the three sticking ways is found usable. With respect to each of the basic patterns as shown in FIG. 5C, 5E and 5F, there are three sticking ways and such judgement is made according to the respective requirements.

When, at step $S_{702}$, the cut regions are judged as being not capable of being stuck on the sheet according to the respective basic pattern as they stand, a reduction flag is attached at step $S_{703}$ to the data of the respective cut regions, indicating that it is impossible to stick the cut regions on the sheet according to the judged basic pattern. At step $S_{704}$, examination is made as to whether or not the judgement is made in connection with all the basic patterns. If the answer is in the negative, the process goes back to step $S_{701}$. Then, the cut regions are judged in connection with the next basic pattern. Where the judgement of the cut regions in connection with all the basic patterns is completed, judgement is made, at step $S_{705}$, as to whether or not there is any basic pattern with no reduction flag attached thereto, i.e., any basic pattern which permits the sticking of the regions $C_1$, $C_2$, $C_3$. If the answer is in the affirmative, the basic pattern with the reduction flag attached thereto is discarded at step $S_{706}$. That, at step $S_{705}$, the answer is in the negative means that there is no basic pattern with no reduction flag attached thereto, i.e., it is impossible to stick the cut regions on the sheet according to each of all the basic patterns without being reduced.

At step $S_{707}$, judgement is made as to whether or not it is necessary to reduce the cut region in connection with the individual basic pattern on the basis of the reduction flag. If reduction is necessary, the reduction process is carried out at step $S_{709}$. At step $S_{701}$, the coordinate data of a new cut region which has been subjected to the reduction process are stored in the RAM of sticking region computer 16. If reduction is not necessary, the first coordinate data of the cut region are stored.

At step $S_{711}$, judgement is made as to whether or not it is necessary to reduce the cut region in connection with all the basic patterns. If the answer is in the negative, those steps beginning with step $S_{707}$ are repeated in connection with the remaining basic patterns. If the answer is in the affirmative, at step $S_{712}$, calculation is made of the coordinates of the sticking regions $D_1$, $D_2$, $D_3$ in the fit basic pattern according to an order of the areas of cut regions $C_1$, $C_2$, $C_3$ as will be set out later in more detail. At step $S_{713}$, judgement is effected as to whether or not the calculation of the sticking regions in connection with all the basic patterns is completed. If the answer is in the affirmative, then an image editing process is performed.

Figure 8:
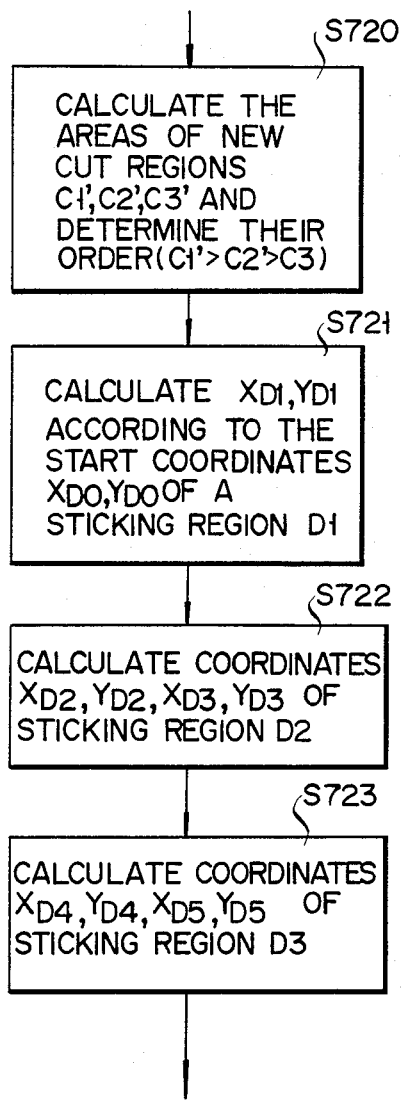
FIG. 8 shows a flow chart showing a sticking region calculating process of FIG. 7.

Step $S_{712}$ at which the sticking regions are calculated will be explained below by referring to FIG. 8.

At step $S_{720}$, image processor 14 calculates the areas of new cut regions $C_1'$, $C_2'$, $C_3'$ on the basis of the coordinate data of the new cut regions to be stuck and determines the order of these areas. For example, assume that $C_1' > C_2' > C_3'$. For convenience of explanation, let it be assumed that the areas of the cut regions are originally $C_1(=C_1') > C_2(=C_2') > C_3(=C_3')$.

At step $S_{721}$, the coordinates of sticking region $D_1$ are calculated. The coordinates $(X_{D0}, Y_{D0})$ on a point $P_{D0}$ of region $D_1$ are stored, as the head address of the basic pattern of FIG. 5A, in the ROM of sticking region computer 16. Thus, the coordinates on the point $P_{D1}$ are calculated as $X_{D1} = X_{D0} + X_1$ and $Y_{D1} = Y_{D0} + Y_1$. At step $S_{722}$, the coordinates of sticking region $D_2$ is calculated and the coordinates on the point $P_{D2}$ are found as $X_{D2} = X_{D0}$ and $Y_{D2} = Y_{D1} + a$, where $a$ corresponds to a predetermined spacing. The coordinates on the point $P_{D3}$ are calculated as $X_{D3} = X_{D2} + X_2$ and $Y_{D3} = Y_{D2} + Y_2$. At step $S_{723}$, the coordinates of sticking region $D_3$ are found. The coordinates on the point $P_{D4}$ are found as $X_{D4} = X_{D0}$ and $Y_{D4} = Y_{D3} + a'$, where $a'$ also corresponds to a predetermined spacing. The coordinates on the point $P_{D5}$ are found as $X_{D5} = X_{D0}$ and $Y_{D5} = Y_{D4} + Y_3$. In this way, the coordinates of the sticking regions $D_1$, $D_2$, $D_3$ are found in connection with each of the fit basic patterns. The coordinate data of those sticking regions are stored in the RAM of sticking region computer 16 for each basic pattern.

Figure 9:
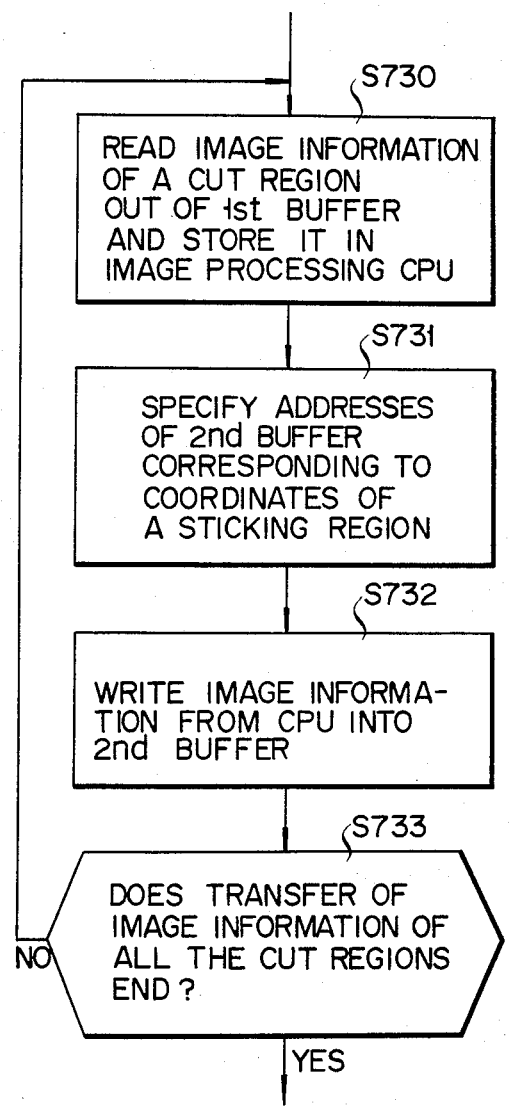
FIG. 9 shows a flow chart of an image editing process.

The image editing process will be explained below by referring to the flow chart of FIG. 9.

At step $S_{730}$, image processor 14 reads image information in cut region $C_1$ out of first buffer 124 to temporarily store them therein. At step $S_{731}$, image processor 14 designates that address of a memory area of second buffer 125, on the basis of the calculated coordinate data of the sticking region $D_1$, where the image information in cut region $C_1$ are to be stored. At step $S_{732}$, image processor 14 writes the image information in cut region $C_1$ into the address which is designated by second buffer 125.

At step $S_{733}$, judgement is effected as to whether or not the transfer of the image information of all the cut regions is completed. If the answer is in the negative, the above-mentioned steps are repeated. As a result of these processes, the image information of sticking regions $D_1$, $D_2$, $D_3$ are stored in an A4 size memory area of second buffer 125 in that relation as shown in FIG. 3. The edited image information is stored in second buffer 125 for each of fit basic patterns.

Figure 10:
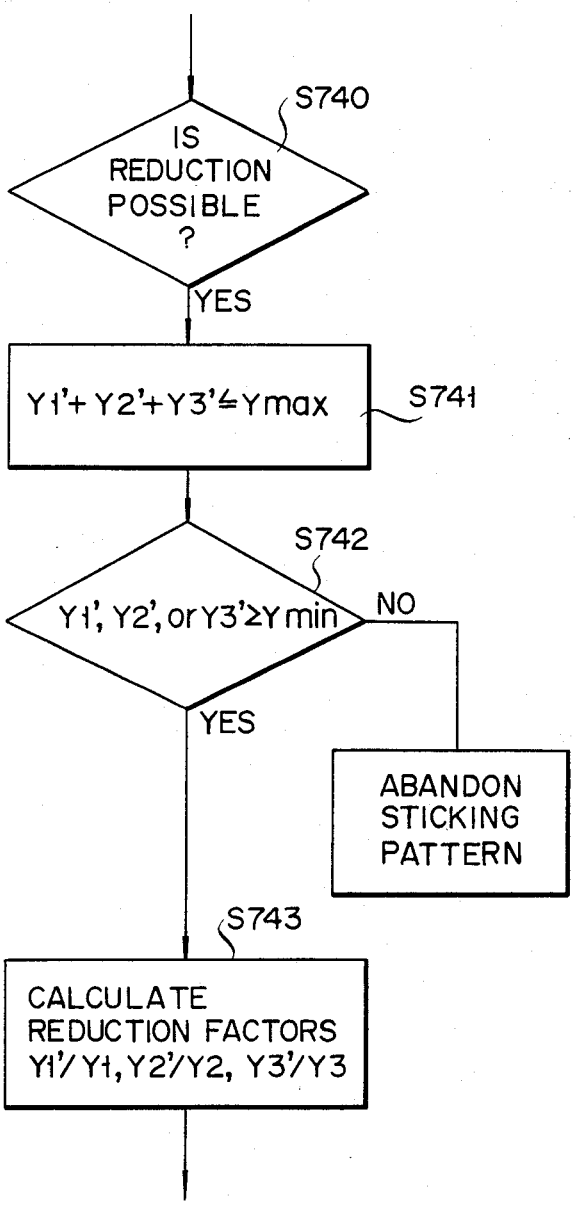
FIG. 10 shows a flow chart of a reduction process.

The resuction process step $S_{709}$ will be explained below in more detail by referring to FIG. 10.

At step $S_{740}$ the attributes of the cut regions are judged and if the reduction is not inhibited for the cut regions, the process goes to step $S_{741}$. At step $S_{740}$ if reducible cut regions $C_1$, $C_2$, $C_3$ are edited such that they are arranged vertically according to the basic pattern as shown, for example, in FIG. 5A, the heights $Y_1'$, $Y_2'$, $Y_3'$ of the cut regions $C_1$, $C_2$, $C_3$ are arbitrarily found to provide $Y_1' + Y_2' + Y_3' \leq Y_{max}$. At step $S_{742}$, judgement is performed as to whether or not $Y_1'$, $Y_2'$, $Y_3'$ are greater than $Y_{min}$. With the height of a pre-edited display character and readable minimum value of the reduced character representing A and B, respectively, $Y_{min}$ is given by $$Y \times B/A$$

At step $S_{741}$, judgement is made as to whether or not $Y_1' \geq Y_{1min}$, $Y_2' \geq Y_{2min}$ and $Y_3' \geq Y_{3min}$. If the answer is in the negative, i.e., the reduced character is illegible, the basic pattern as shown in FIG. 5A is abandoned. If at step $S_{742}$ the answer is in the affirmative, the process goes to step $S_{743}$ in which reduction rates $Y_1'/Y_1$, $Y_2'/Y_2$ and $Y_3'/Y_3$ are calculated the reduction rates are stored in the RAM of sticking region computer 16. The coordinates of points $P_{D1}$ through $P_{D5}$ of sticking regions $D_1$, $D_2$, $D_3$ as shown in FIG. 3 are calculated on the basis of the reduction rates. Where the sticking pattern as shown in FIG. 3 is involved, calculation is made of the coordinates of the sticking regions which are reduced in the Y-axis direction only. These coordinate data are stored in the RAM of sticking region computer 16. In the editing process, the image information to be stored in that address of second buffer 125 which is designated by image processor 14 and based on the reduced coordinates is supplied from image processor 14 through reduction circuit 17 to second buffer 125. Reduction circuit 17 reduces the image information in accordance with the reduction rate for each region. The reduction process is performed for each basic pattern as shown in each of FIGS. 5A through 5F. Those basic patterns which make the image not readable upon reduction are discarded.

It is desirable to calculate the sticking regions according to the designation order of the cut regions, i.e., the order of cutting. As set out above, those data (hereinafter referred to as the designation data) relating to the order of cutting are obtained at step $S_3$. Suppose, for example, that designation is effected in the order of cut regions $C_1$, $C_2$ and $C_3$ as shown in FIG. 3. The coordinate data and designation data are stored in the RAM of sticking region computer 16. The following steps correspond to the steps in FIG. 7. Like step 701, judgement is made as to whether or not cut regions $C_1$, $C_2$, $C_3$ can be stuck on the sheet, according to the basic patterns of FIGS. 5A through 5H, on the basis of the coordinate data of the cut regions.

Figure 11A:
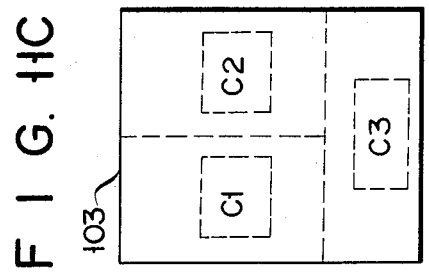
FIGS. 11A to 11F show basic sticking patterns in which cutting regions are stuck in their cutting order.
Figure 11D:
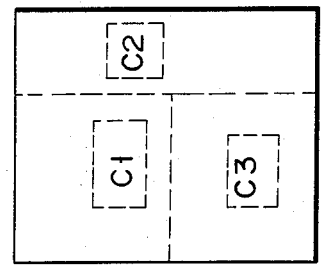
Figure 11B:
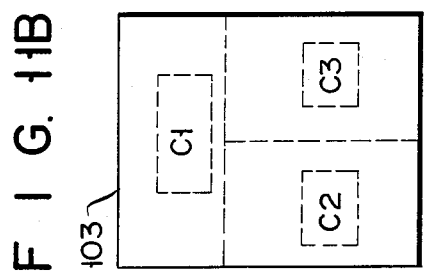
Figure 11E:
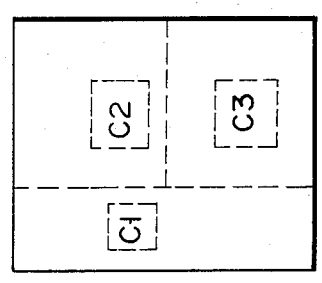
Figure 11C:
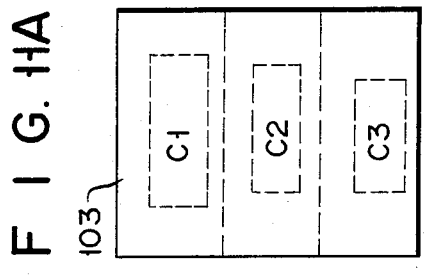
Figure 11F:
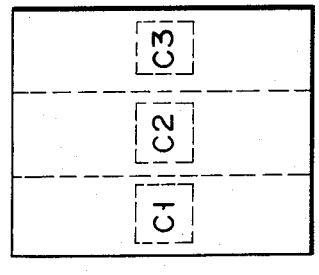

It is to be noted that, in this case, the requirement is given that the cut regions $C_1$, $C_2$, $C_3$ are stuck on the sheet in this order according to the basic pattern. In connection with the basic pattern as shown in FIG. 5A, judgement is made as to whether or not cut regions $C_1$, $C_2$, $C_3$ can be stuck on the sheet as shown in Fig. 11A. In connection with the basic patterns as shown in FIGS. 5B through 5F, judgement is effected as to whether or not cut regions $C_1$, $C_2$, $C_3$ can be stuck on the sheet as shown in Figs. 11B through 11F. This judgement is the same as that at step 701 and is performed by the sum of heights or widths of cut regions $C_1$, $C_2$, $C_3$. The sticking regions of the sheet are calculated hereinafter in the order of cutting by the same processing steps.

In the above-mentioned embodiment, three cut regions have been used, but two or four or more cut regions may be used. In this case, the basic sticking pattern data is stored in the ROM of sticking region computer 16 for each number (2, 3, 4 . . . ) of used cut regions.

The cut region has been explained as being a rectangular region, because the designation of the rectangular region is easiest. Circular, square and polygonal regions may be designated at the user's request. Not only the rectangular coordinates, but also the polar coordinates, may be used for coordinate designation. The rectangular region may be designated by two points on the diagonal, as well as one point and length of two sides.

Although, in the embodiment of this invention so far described, reduction circuit 17 is used, a circuit for selectively performing reduction and enlargement of image information may be used.

An image editing apparatus of this invention may be coupled to a facsimile unit so as to edit received documents and transmit the edited documents.

What we claim is:

1. A cut-and-paste image editing apparatus comprising:

input means for separately inputting documents each having image information to be edited;

display means for displaying each of the documents;

cutting region designating means for designating at least one cutting region of a document displayed on said display means and providing coordinate information of the cutting region;

first image information storing means for storing image information of each cutting region designated by said cutting region designating means;

pasting region computing means storing in advance a plurality of basic pasting patterns each representing a layout for pasting a plurality of cutting regions on a sheet, and responsive to the coordinate information of said cutting regions provided by said cutting region designating means for judging whether the cutting regions can be pasted on the sheet according to each of the basic pasting patterns, computing the coordinates of pasting regions corresponding to the cutting regions for each of basic pasting patterns which have been so judged, and storing the coordinate information of each of the pasting regions;

second image information storing means having storage areas each corresponding to a size of a sheet on which a plurality of cutting regions are pasted according to a basic pasting pattern;

means for transferring the image information of the cutting regions stored in said first image information storing means to locations of the storage area of said second image information storing means, designated by the coordinate information of the corresponding pasting regions stored in said pasting region computing means for each pasting pattern according to which the cutting regions can be pasted; and means for outputting the image information of the cutting regions stored in said second image information storing means in a form such that the cutting regions have been pasted on a sheet according to at least one of the basic pasting patterns which have been judged that the cutting regions can be pasted.

2. Apparatus according to claim 1, in which each of the cutting regions is rectangular in shape, and said cutting region designating means designates the cutting region by two points on a diagonal of the rectangular cutting region.

3. Apparatus according to claim 1, in which said input means comprises scanning means for optically scanning the document to produce a binary electrical signal.

4. Apparatus according to claim 1, in which said input means comprises an image file apparatus for storing documents, and the documents to be edited are retrieved from said image file apparatus.

5. Apparatus according to claim 1, in which said output means comprises a cathode ray tube.

6. Apparatus according to claim 1, in which said output means comprises a printer for printing the cutting regions on a sheet.

7. Apparatus according to claim 1, in which said pasting region computing means is arranged to compute, when the cutting regions can be pasted according to at least one pasting pattern if at least one of the cutting regions is reduced, reduced coordinates of a cutting region to be reduced, and an image information reduction circuit is provided which reduces the image information of the cutting region to be reduced stored in said first image information storing means and transfers the reduced image information to said second image information storing means.

8. Apparatus according to claim 1, in which said means for outputting the image information is arranged to display the image information of the cutting regions for each of the basic pasting patterns which have been judged that the cutting regions can be pasted, and to select a preferred pasting pattern from the basic pasting patterns.

9. Apparatus according to claim 1, in which said cutting region designating means is arranged to designate attributes of the cutting regions, information on the attributes of the cutting regions being stored in said pasting region computing means, and said pasting region computing means is arranged to judge, according to the information on the attributes of the cutting regions, basic pasting patterns according to which the cutting regions can be pasted, and to compute coordinates of pasting regions corresponding to the cutting regions which can be pasted according to the attributes thereof.

10. Apparatus according to claim 9, in which the attributes of the cutting regions relate to the order of areas of the cutting regions.

11. Apparatus according to claim 9, in which the attributes of the cutting regions relate to the priority of the cutting regions.

12. Apparatus according to claim 9, in which the attributes of the cutting regions relate to the cutting order of the cutting regions.

13. Apparatus according to claim 9, in which the attributes of the cutting regions relate to the inhibition of the reduction of the cutting regions.

* * * * *